Oct. 14, 1969       J. G. SIBAKIN ET AL       3,472,650
                    ELECTRIC-ARC STEELMAKING
Filed Aug. 11, 1966                            6 Sheets-Sheet 1

FIG. 1

INVENTORS
J. GEORGE SIBAKIN,
GORDON A. ROEDER &
BY    PAUL H. H. HOOKINGS

*Fay, Sharpe & Mulholland*

ATTORNEYS

Oct. 14, 1969       J. G. SIBAKIN ET AL       3,472,650
                    ELECTRIC-ARC STEELMAKING
Filed Aug. 11, 1966                           6 Sheets-Sheet 4

FIG. 6
PRIOR ART

INVENTORS
J. GEORGE SIBAKIN,
GORDON A. ROEDER &
PAUL H. H. HOOKINGS
BY
*Fay, Sharpe & Mulholland*
ATTORNEYS

FIG. 7

INVENTORS
J. GEORGE SIBAKIN,
GORDON A. ROEDER &
PAUL H. H. HOOKINGS

BY Fay, Sharpe & Mulholland

ATTORNEYS

United States Patent Office 3,472,650
Patented Oct. 14, 1969

3,472,650
ELECTRIC-ARC STEELMAKING
Jaroslaw George Sibakin, Ancaster, Ontario, Gordon A. Roeder, Burlington, Ontario, and Paul H. H. Hookings, Edmonton, Alberta, Canada, assignors to The Steel Company of Canada Limited, Hamilton, Ontario, Canada, a company of Canada, Metallgesellschaft A.G., Frankfurt am Main, Germany, a German company, and Pickands Mather & Co., Cleveland, Ohio, a company of Delaware
Filed Aug. 11, 1966, Ser. No. 571,837
Claims priority, application Canada, Sept. 3, 1965, 939,972
Int. Cl. C21b 13/12; C21c 5/52
U.S. Cl. 75—12                                             21 Claims

ABSTRACT OF THE DISCLOSURE

A method of steelmaking in a direct-arc furnace utilizing continuous charging of discrete iron-bearing material having a composition within the range of from about 76 percent to about 99.5 percent by weight total iron with a residual oxygen content of from about 0.1 percent to about 1.75 percent by weight at a controlled rate such that the desired tap temperature and carbon content are reached substantially concurrently with the end of the continuous charging.

---

This invention relates to electric-arc steelmaking and is particularly directed to a method of continuously charging iron bearing material into an electric-arc steelmaking furnace.

Conventional electric-arc steelmaking furnaces, Heroult direct-arc type, utilize scrap metal as melting stock which is top-charged or door-charged into the furnace. The charging of scrap materials into the furnace necessitates, in addition to the initial furnace charge, from two to as many as six scrap recharges in order to obtain the desired final metal charge weight in the furnace, the number of recharges required depending upon the size and shape of the scrap used. Prior to each recharging of the furnace with scrap, the power is shut off, the hot electrodes withdrawn and, in a modern top charged furnace, the roof lifted and swung to one side. The scrap charge is then placed in the furnace by means of a drop-bottom bucket or the like which is brought to the open furnace and held in position over it by an overhead crane, this method of charging scrap to the furnace heretofore having been considered to be the quickest and most efficient technique available. The time taken to complete a recharge of scrap varies, a charging time of from 4 to 7 minutes being normal for a modern steelmaking furnace. It is evident that elimination of these interruptions for recharging from the steelmaking sequence would result not only in shorter heat times but also in reduced energy consumption per ton of steel produced since considerable heat lost from the furnace chamber by radiation when it is opened to receive a scrap charge must be subsequently recovered.

In electric-arc steelmaking furnaces, the electric current passes through one electrode, across the arc created between the foot of the electrode and the scrap or bath, then through the scrap or bath and up across another arc to an adjacent electrode, completing the circuit through this second electrode. The arcs constitute a variable resistance in the circuit which can be altered by raising or lowering the electrodes to change the arc length, the electrodes being moved up and down by automatic means which seek a predetermined position and therefore correct resistance to maintain the electric current and applied voltage at the value chosen by the furnace operator. Because the scrap tends to fall against the electrodes as the electrodes bore through the scrap charge, the arcs are frequently short-circuited, resulting during the meltdown period, in effect, in a series of short circuits; i.e., one or more of the three phases of the furnace transformer secondary circuit is short-circuited. Arc energy interruptions resulting from these short circuits normally are brief in duration being in the order of a few seconds. However, interruptions as long as 30 seconds sometimes occur if the electrode is short-circuited by scrap falling against it at a point some distance above the foot of the electrode necessitating the electrode to pull out of the bore cavity to a point above the touching scrap before effective power can be resumed. It is clear that elimination of these frequent power interruptions by stabilizing the arc during the meltdown period of steelmaking would result in employment of a higher average electrical energy input and realization of a shorter heat time.

Conventional electric-arc furnaces furnish most of the heat for melting scrap by means of a direct arc formed between each electrode and scrap material.

The electric-arc provides a very intense source of high temperature heat (6300° F. for the carbon arc), heat being radiated from along the length of the arc and generated at the interfaces of arc/metal or slag, and arc/electrode. These locations of high temperature referred to herein as the "arc flare zones" normally occupy positions at the foot of each electrode flaring away from the edge opposite to the furnace center toward the wall of the furnace and arcing downwardly to the bath. The rate at which a given charge will absorb the heat from the three arc flare zones is largely dependent upon the area of cold metal exposed to the radiation from these zones, the rate of heat transfer diminishing continuously as the average temperature of the scrap charge rises. After meltdown, the energy dissipated by the arc zones must be decreased in order to protect the refractory side walls and roof in line of sight of the arcs from overheating. It is clear that the presence of means or a method of protecting the furnace refractories would permit full power utilization at all times during steelmaking with resulting shortened heat time, i.e. the time to make one batch (heat) of steel.

The steelmaking cycle consists of five operations; the "meltdown period" when the scrap is melted; "refining period" when the impurities of the molten steel bath are removed and alloying and deoxidizing additions are made; "tapping period" when all of the molten charge is removed from the furnace chamber; "fettling period" when the furnace bottom and banks are repaired in preparation for the next heat; and "charging period" when the scrap metal is placed in the furnace. Of these operations, the refining period can be the most variable, the length of the refining period depending upon the composition of the metal bath on completion of the meltdown of the scrap. In that scrap is a heterogeneous material of variable and often unknown chemical composition, having been collected from a multiplicity of sources, the composition of the melt bath at meltdown usually cannot be predicted with a reasonable degree of accuracy. For example, it is often found that the sulphur or phosphorus content of the metal at meltdown exceeds the amount specified for the finished steel. In such cases, a lengthy steelmaking procedure known as the two-slag practice may be necessary to lower the content of these elements. This practice consists of shutting off the power, raising the electrodes, back-tilting the furnace slightly, and then raking the slag off the metal pool through the charging door using a rabble. A second slag is then made up by charging for example lime, powdered coke, fluorspar and sand to the furnace. This procedure can take from 20 to 60 minutes. It is also usually found that the carbon content of the bath after meltdown is either too high or too low for the grade of steel specified. The carbon content is decreased in the refining period by making additions of iron ore or mill scale or by lancing the bath with gaseous oxygen. The carbon content is increased by making additions of coke, coal or graphite to the bath. Dipping the graphite electrodes in the bath is sometimes used although this is an expensive method of recarburizing the bath. The temperature of the steel prior to tapping must fall within a narrow specified temperature range somewhat above the liquidus temperature of the steel, particularly if the molten steel is to be continuously cast. It is evident that elimination or shortening of this prolonged period of bath composition and temperature adjustment would constitute a very significance improvement in electric-arc steelmaking.

In addition to charging scrap metal to an electric-arc steelmaking furnace, sponge iron has been used, in most cases, with poor results; i.e. longer heat times and higher power consumptions being necessitated. The reason for this is as follows: At the start of meltdown, the electrodes first cause the scrap immediately below the electrodes to melt with the result that this molten metal in flowing downwardly freezes on the colder scrap lower in the furnace. As more and more scrap is melted, a pool of metal collects on the bottom of the furnace and the whole charge then seems to melt from the bottom up. With a sponge iron charge, the melting sequence becomes more difficult in that sponge iron particles, probably due to the presence of low temperatures gangue components, tend to weld together under the application of heat forming an impermeable and difficult to melt cluster. Due to the small, uniform size of sponge iron particles, and in particular sponge iron pellets, these materials pack tightly together when charged to the electric-arc furnace. The heat in the furnace from either the molten metal or the hot electrodes cause the outer layers of the sponge iron pile in the furnace to fuse, sealing off and effectively insulating the sponge iron in the interior of the pile from receiving heat directly. Since sponge iron is a poor heat conductor, the fused pile or cluster melts slowly. It is evident that a method for eliminating the formation of sponge iron clusters would permit effective utilization of sponge iron in the electric-arc furnace. Sponge iron is a preferred alternative to scrap in that it has a known and relatively consistent chemical composition.

In many direct reduction processing plants, a considerable portion of the sponge iron produced is finer than 3/16 inch and, in some of these plants, the entire output is very much finer than this size. When such fine sponge iron is charged to an electric-arc steelmaking furnace difficulty is experienced in melting down the charge, particularly when the fine material constitutes more than 20 percent of the charge in that the metallic fines tend to form a closely packed layer of very high density in the furnace. During the meltdown this layer acts as a barrier to the molten metal and slag formed under the descending electrodes with the result that according to conventional practice, an adverse melting condition is created; i.e., melting of the charge from the top to bottom. In this situation, the arcs are exposed to the roof and to the upper courses of the side wall bricks with resultant damage to the affected refractories. Also, under this situation, the fines tend to fuse firmly together forming a very difficult to melt mass or cluster necessitating, as a result, a prolonged meltdown period with attendant higher than normal energy consumption.

Another disadvantage of fine material is the reduced yield that can result from its use. Some of the fine metallic material dropped into the furnace in the recharges tends to float on the slag surface and if a slag flushing operation is performed at this time, the floating metal may leave the furnace via the slag with a consequent serious decrease in metallic yield. To overcome the above disadvantages, it has been conventional practice to cold or hot press the metallic fines into dense briquettes having a suitable size and shape. Briquettes give no problems in melting. Although briquetting represents a solution to the problem of employing fines in steelmaking, it also represents additional cost both of capital to purchase a briquetting press and of operation to power, maintain and to man the press. A steelmaking procedure whereby metallic fines could be used directly in the furnace without a decrease in productivity and an increase in energy consumption is desirable in obviating these capital costs.

Many techniques have been devised and attempted over the years to improve the operation of electric-arc steelmaking furnaces including the charging of sponge iron into the furnace through holes provided in the furnace roof. Heretofore such techniques have not led to significant improvement in the steelmaking operation and, therefore, such methods have not met with ready acceptance and commercial use. For example, German Patent No. 954,699, issued Dec. 20, 1956, describes an apparatus for charging materials to an electric-arc steelmaking furnace, but does not give sufficient operating instructions to enable a steelmaker to carry out a process of concurrently charging, melting and refining the iron-bearing feed. Nor does the patent teach the optimum location of feeding iron-bearing material. For another example, United States Patent No. 3,153,588, issued Oct. 20, 1964 teaches a technique for the feeding of sponge iron into an electric-arc steelmaking furnace. According to this patent, an essential part of the operation is that "the arc should be covered by sponge iron and, therefore, the arc submerged in the sponge iron." As mentioned previously, this practice leads to the formation of clusters which are difficult to melt and which result in a condition of continuous electrical shorting of the electrode. Accordingly, the teachings of this patent are contrary to the process of the present invention which is found economically operative as will be described and claimed hereinbelow.

We have found that these problems can be substantially overcome by forming an open bath of carbon containing molten metal having a slag cover in an electric-arc furnace and continuously feeding a discrete free-flowing, iron-bearing material having a composition within the range of from about 76 percent to 99.5 percent by weight total iron with a residual oxygen content of from 0.1 percent to 1.75 percent by weight into said slag cover at a controlled rate relative to the power input to the furnace such that the molten metal has substantially reached the desired tap temperature and carbon content concurrent with completion of the feeding of said iron-bearing material to the furnace; thus providing a steelmaking cycle having uniform melting of the charge, improved power input control, reduced heat losses, a reduced charge to tap time, and predetermined metal composition.

Briefly, the invention concerns a method of steelmaking in an electric-arc furnace having electrodes wherein the furnace may be initially charged with both scrap metal and discrete particles of iron-bearing material, said discrete particles having a composition within the range of from 76 percent to 99.5 percent by weight total iron and a residual oxygen content of 0.1 percent to 1.75 percent by weight, preferably 0.6 percent to 1.2 percent by weight. Throughout the application, figures relating to oxygen refer to residual oxygen combined with the iron. The initial charge of the electric furnace includes in addition to the metal and iron-bearing material the necessary fluxing, carbon and alloying additives. It is not necessary that the discrete particles be present in the initial charge and, accordingly, the charge may initially be made up with only scrap metal.

After the furnace is charged, the electrodes are positioned in proximity to the charge and power is applied to direct arcs from the electrodes to the charge to form bore cavities which consolidate therein to form a trefoil-shaped pool of molten metal having a slag layer. The discrete particles of iron-bearing material are then continuously fed into the said pool at locations of the flare zones while the power is continuously applied to simultaneously melt and refine the charge. This continues until the entire charge is melted and refined, the discrete particles normally constituting up to about 82 percent of the total metal charged and in some cases constituting up to 100 percent of the total metal charged. The refined steel is then tapped from the furnace before the total energy consumption exceeds about 700 kilowatt hours per ton of the refined steel. Thus, the iron-bearing material is refined as it is melted and while the continuous charging occurs so that no extended refining time at the end of the charging cycle is required and no power interruptions or temperature recovery times are necessary, thereby insuring that the total energy consumption can be held below 700 kilowatt hours per ton even though up to about 8 percent of the iron compounds have not been reduced to the metallized state.

The term "steelmaking" where used herein, is intended to include making an iron-carbon alloy where the carbon is in the approximate range of from 0.02 percent to 1.8 percent and the other constituents are in a refined state.

It is, therefore, an important object of the present invention to overcome the aforementioned problems and disadvantages inherent in prior art processes and, in particular, to shorten the steelmaking time and lower the total energy consumption by eliminating the need for periodic scrap recharges.

It is another important object of the present invention to stabilize the arc during the meltdown period enabling the use of a continuously high average power input to the furnace which will shorten the steelmaking time required.

Another important object of the present invention is to protect the refractory materials in the side walls and roof of the furnace after the scrap is melted, while still maintaining full power input to the furnace.

Still another important object to the present invention is the provision of a simultaneous melting and refining by oxidation method of steelmaking which effectively eliminates the need for the conventional refining period in the steelmaking cycle and which substantially shortens the total steelmaking time and decreases the energy consumption.

And another important object of the invention is to enable the use of fine metallic materials in an electric-arc steelmaking furnace, having a particle size of less than 3/16 inch and in amounts of up to about 80 percent of the charge, with shorter heat times and lower energy consumption than required in conventional practice.

It is a further important object of the present invention to utilize discrete particles of iron-bearing material such as sponge iron having a known composition within the approximate range of 76 percent to 99.5 percent by weight total iron having a residual oxygen content of from 0.1 percent to 1.75 percent together with scrap iron and/or scrap steel, if desired, for the production of steel of predetermined composition.

These and other objects of the invention, and the manner in which they can be attained, will become apparent from the following detailed description of the method and apparatus with reference to the accompanying drawing, in which.

Like reference characters refer to like parts throughout the description of the drawings.

Figure 1:
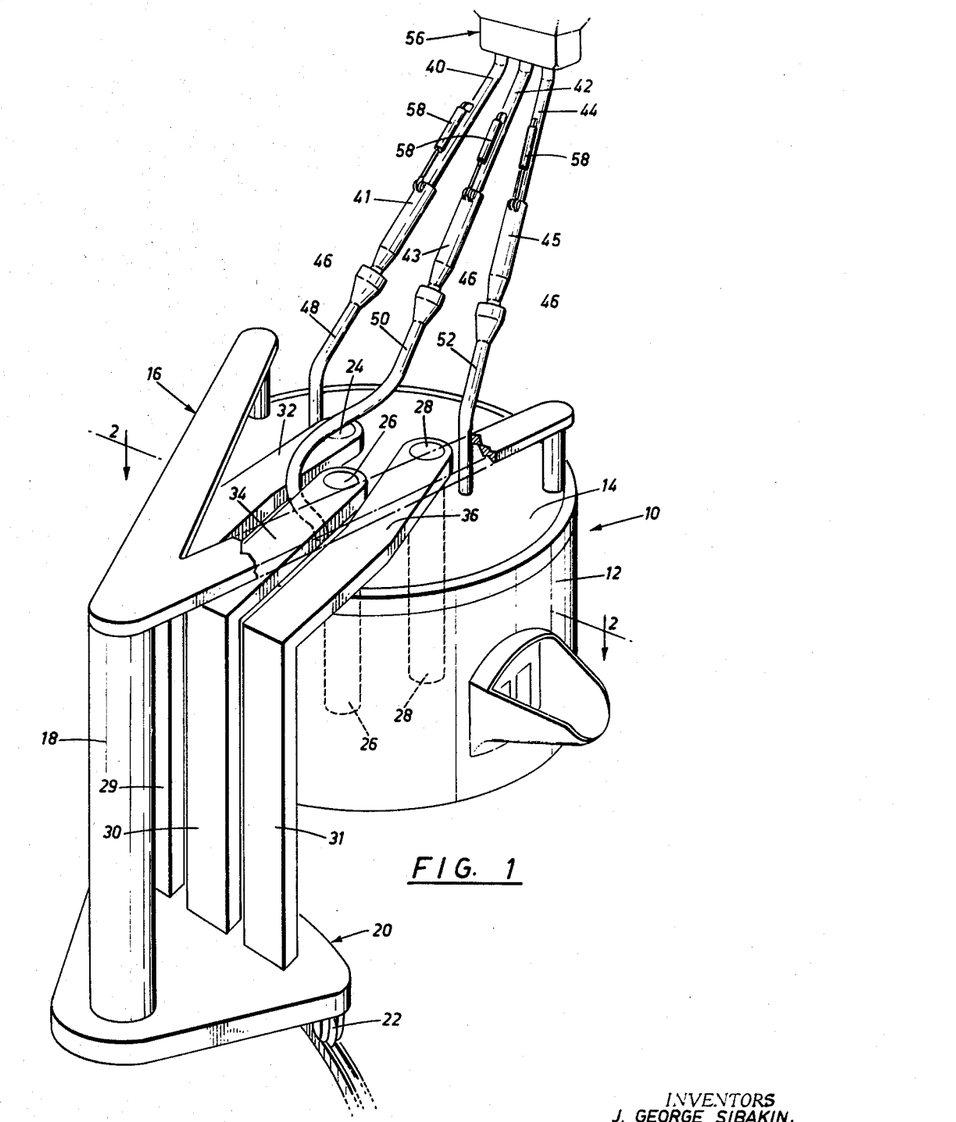
FIGURE 1 is a prespective view, partly cut away, of a three-phase electric-arc furnace of the type employed in the present invention.
Figure 4:
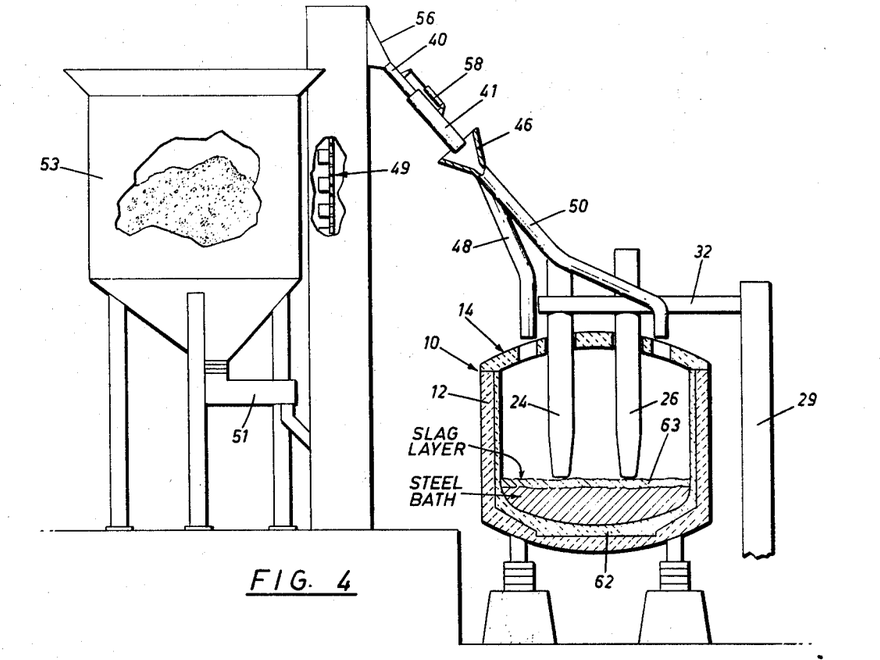
FIGURE 4 is a schematic illustration, in part, of the furnace illustrated in FIGURE 1 showing the charging system for continuous feeding of sponge iron to an open bath in the furnace.

With particular reference to FIGURES 1 and 4, an embodiment of the structure of the present invention will now be described wherein furnace 10 has cylindrical side wall 12 with removable roof 14 secured to arms 16 extending from mast 18. Arms 16 are adapted to be raised and lowered above wall 12 by a hydraulic or mechanical system, not shown, formed in mast 18. Three electrodes 24, 26 and 28 are each mounted on masts 29, 30 and 31 by means of arms 32, 34 and 36 for independently raising and lowering each of said electrodes through openings formed in roof 14 equispaced about the roof center. Masts 18 and 29–31, in turn, are supported by platforms 20 having rollers 22 for pivoting said platform about its axis, thereby moving roof 14 and electrodes 24, 26 and 28 to one side of furnace 10 for loading with scrap material and the like charge materials.

Three conduits 40, 42 and 44 having telescopic extensions 41, 43 and 45 retractable from and extensible into sleeves 46 formed in stationary ducts 48, 50 and 52 are in communication with openings formed in the furnace roof 14 at points between electrodes 24, 26 and 28 respectively and furnace side wall 12. Said conduits, sloping at an angle greater than the angle of repose of the material charged, in this embodiment sloping at an angle of about 40° to the horizontal, are in communication at their upper extremities with a conventional splitter box 56 having gating means for independently regulating the flow of material to each conduit. Mechanical, or pneumatic or hydraulic piston-cylinder units 58 permit the extension and retraction of conduit extensions 41, 43 and 45 to and from their respective sleeve 46 engaging positions. Bucket elevator 49 which receives sponge iron at a controlled rate from weight feeder 51 in communication with hopper 53 continuously feeds splitter box 56.

In operation, roof 14 and electrodes 24, 26 and 28 are lifted and swung away from the furnace 10 for charging to the furnace of scrap iron and/or scrap steel together with fluxing, alloying and carburizing additives, if desired, and said roof and electrodes then returned to their respective operative positions. It may also be desirable to add a portion of the sponge iron to the furnace with the initial charge.

Figure 2:
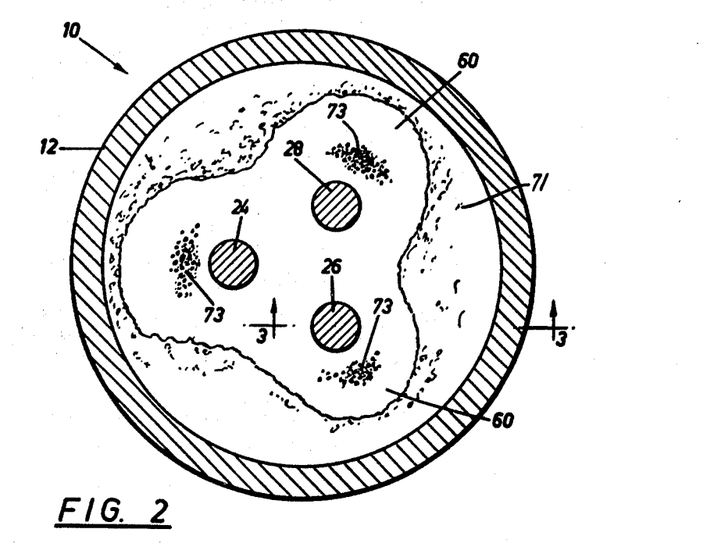
FIGURE 2 is a plan section taken along the line 2—2 of FIGURE 1 showing the formation of bore cavities consolidated into a trefoil-shaped pool within the furnace.
Figure 3:
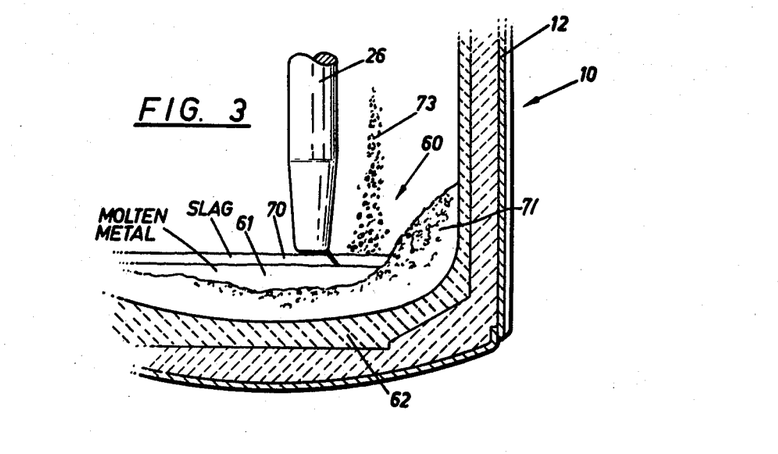
FIGURE 3 is an enlarged vertical section taken along the line 3—3 of FIGURE 2 showing the introduction of sponge iron in proximity to an electrode.

The electrodes 24, 26 and 28 are lowered through their roof openings into proximity to the scrap contained in the furnace and a predetermined voltage applied to each electrode creating an arc which bridges the space between the electrodes and scrap thereby heating and melting the scrap in proximity to the arc. As the scrap melts and falls away from the electrodes, an electrical control system causes the electrodes to be repositioned vertically an optimum distance from the scrap for maintenance or re-ignition of the arc, as necessary, and for maximum production of heat. The electrodes thus independently bore through the scrap, melting the scrap in proximity thereto creating a cavity 60 having a molten metal pool 61 with a slag cover 70 therein below each electrode, the pools coalescing to form a generally trefoil-shaped pool centrally disposed within the furnace with a peripheral shell 71 of iron-bearing material forming a protective lining for the furnace wall, as shown in FIGURES 2 and 3.

The sponge iron charge 73 can be initiated at this stage, preferably into the area of the bath in proximity to and surrounding the arc flare zones by means of conduits 40, 42 and 44.

The rate of continuous charging of the sponge iron to the furnace can be balanced with the power input and heat produced thereby to attain the desired tap temperature with concurrent achievement of the specified carbon content. For example, we have found that at a power input of 7.4 megawatts to a 25 ton furnace, a sponge iron pellet feed rate of 700 pounds per minute resulted in a 6° F. per minute fall in bath temperature and a feed rate of 500 pounds per minute resulted in a 7.5° F. per minute rise in bath temperature.

The carbon content in the initial charge should be sufficient to satisfy requirements for complete reaction with the oxide content of the sponge iron and ensure the desired carbon content in the finished steel. We have found that the reaction of the carbon with the oxygen available in the bath provides a vigorous boiling section which greatly facilitates melting of the sponge iron within the slag layer, improves heat transfer to the molten metal, and accelerates the refining of the steel.

In charging of sponge iron to the pool or substantially open bath, we have also found that a thin slag layer having a controlled low viscosity can be maintained in the furnace for stabilizing the arc and permitting charging of sponge iron to the flare areas with immersion and rapid melting and coalescence of the sponge iron within the slag layer and transfer of the molten iron into the underlying molten iron or steel by gravity. Control of the slag viscosity is important in that a highly viscous slag impedes immersion of the sponge iron and retards melting and transfer of the molten sponge iron through the slag cover into the underlying molten metal. It is desirable to have slag cover of sufficient fluidity to enable the discrete charge material to penetrate the surface of the slag for melting and solutionizing therein aided by the carbon boil as is discussed above, and to avoid the formation of a cover of sponge iron on the slag. Therefore, by the term, "open bath," is meant a bath having at most a very fluid slag cover 70 which may be moved by the arcs to expose the molten metal below them.

Typically, the slag analysis could be represented by the following range and example of a heat with slag within the range:

| | Range (percent by weight) | Typical Slag Example at Meltdown (percent by weight) |
|---|---|---|
| $SiO$ | 2.0–40.0 | 32.84 |
| $Al_2O_3$ | 0.0–20.0 | 6.29 |
| $CaO$ | 1.0–50.0 | 17.44 |
| $MgO$ | 0.0–25.0 | 23.81 |
| $P_2O_5$ | 0.0–2.0 | 0.04 |
| $FeO$ | 3.0–40.0 | 14.60 |
| Other | | 4.98 |

The slag basicity ratio of typical heats is in the range of 1.0 to 1.5. The basicity of the typical heat example given above was 1.1, i.e., the ratio of "bases" to "acids" was 1.1.

Low basicity of the slag not only decreases the viscosity of the slag but also creates poor electrical conductivity conditions so that the arc tends to be buried within the slag layer. This permits high power to be used with less danger of overheating the side walls from an exposed arc.

The slag weight in a typical heat ranges from 100 to 125 pounds per net ton of steel. This is significantly lower than the approximately 150 pounds per ton of steel made from a charge of 400 percent scrap.

The slag usually covers the metal bath to a depth of about 2 to 3 inches in order to insure penetration and melting of the continuously fed pellets.

Surprisingly effective results have been attained by the methods of the invention as will be evident from the following general description and examples given hereinbelow carried out in two, three-phase electric-arc steelmaking furnaces with nominal rated capacities of 15 and 25 tons, identified as furnace A and furnace B respectively, and powered in each case by an 8000 kva. transformer.

In general, acocrding to the method of the invention, the furnace may be initially charged with sponge iron and steel scrap. Typical chemical compositions by weight of sponge iron pellets of the type disclosed are as follows:

CHEMICAL ANALYSES OF SPONGE IRON PELLETS BY PERCENT WEIGHT

| | A | B | C | D | E | F | G |
|---|---|---|---|---|---|---|---|
| Total Fe | 92.80 | 87.70 | 78.70 | 90.85 | 97.09 | 94.59 | 89.3 |
| Metallic Fe | 89.94 | 82.54 | 72.73 | 90.20 | 94.11 | 91.35 | 83.2 |
| Iron oxide | 3.68 | 5.17 | 7.68 | | 3.83 | 3.24 | 7.86 |
| Oxygen in iron oxide | 0.82 | 1.15 | 1.71 | 0.10 | 0.85 | 0.72 | 1.75 |
| Carbon | 0.098 | 0.409 | 0.125 | 0.15 | 0.194 | 0.42 | 0.19 |
| Gangue: | | | | | | | |
|   Sulphur | 0.008 | 0.051 | 0.014 | 0.008 | 0.029 | 0.010 | 0.042 |
|   Phosphorus | | | 0.046 | | | | |
|   Titania | | | 10.09 | | | | |
|   Lime | 0.32 | 1.35 | 0.7 | 0.60 | 0.20 | 0.76 | 0.20 |
|   Magnesia | 1.47 | 2.52 | 0.7 | 2.40 | 0.58 | 0.64 | 0.66 |
|   Silica | 3.88 | 4.84 | 1.2 | 2.04 | 0.50 | 1.86 | 3.88 |
|   Alumina | 0.60 | 1.87 | 5.4 | 0.96 | 0.56 | 1.00 | 0.17 |
| Other Gangue | | 0.10 | 0.5 | | | | 4.60 |
| Percent metallization | 96.9 | 94.1 | 92.4 | 99.28 | 97.0 | 96.6 | 93.2 |

Percent metallic Fe over percent total iron times 100 equals percent Metallization.

The scrap used consists of about 65 percent mixed, unprepared material and about 36 percent heavy melt material.

Carbon usually in the form of petroleum coke (due to its availability and low cost) is also added to the initial charge to provide carbon for the boil throughout the heat and to ensure sufficient carbon in the bath at the end of the heat.

This initial charge is partially melted using a circuit power in the furnace system of about 6.8 megawatts.

When partial meltdown has been reached, controlled continuous pellet feeding is started. The initial feed rate in the various heats ranges from 300 to 500 pounds per minute. As the heat progresses, the feed rate is varied, as required, in order that the pellets will melt as soon as they make contact with, and penetrate the slag. If mounds of pellets, i.e., sponge iron covers, start to accumulate, the feed rate is slightly reduced in order to clear the mounds and regain the bath temperature. After approximately 2000 pounds of pellets have been charged, the transformer voltage settings are changed to produce a shorter arc with only a slight diminution in power.

The pellet feed is completed at this level of power input with variations in the feed rate being dependent upon the bath temperature, which is checked periodically with an immersion thermocouple, to reach a bath tempearature near the tapping range for continuous casting of about 2950° to 3000° F. at the same time as pellet feeding is completed.

During a heat, metal bath samples are taken in order to follow the carbon drop of the melt, it being desirable to have the bath carbon within tapping range at the same time that the bath temperature approaches the tapping range. A final bath sample is taken after the pellet feed is completed.

No conventional refining period is required and the heats are thus able to be tapped as soon as the chemistry of the final sample is known. Because no sulphur or phosphorus problems generally are encountered with the iron-bearing materials used, it is possible to make the heats with no lime or limestone additions to the meltdown slag and replace it with a second slag.

Steels were made to the following specifications, with the intermediate 32 and 28 reinforcing bar grades predominating:

| Grade of steel | Range in percentage by weight of steel | | | | |
|---|---|---|---|---|---|
| | C | Si | Mn | S (max.) | P (max.) |
| Intermediate 32 | .30/.34 | .15/.30 | .45/.65 | .050 | .050 |
| Intermediate 28 | .28/.32 | .15/.30 | .45/.65 | .050 | .050 |
| A 36 (ASTM grade) | .12/.17 | .15/.30 | .50/.75 | .045 | .040 |

EXAMPLE 1

An initial charge consisting of 6,000 pounds of scrap and 12,400 pounds of sponge iron pellets of the composition described above as type A together with 400 pounds of petroleum coke was charged to the 15 ton A furnace. The electrodes were lowered and power applied for 24 minutes which resulted in the formation of a pool of molten metal therein. Sponge iron pellets, essentially spherical in shape and having a size range of minus 5/8 to plus 3/16 inch, were then introduced through three conduits at locations near the arc flare zones at an average rate, when charging of 400 pounds per minute until a total of 14,000 pounds of pellets from continuous charging was in the furnace to make a total pellet charge of 26,400 pounds or 81.5 percent of the metallic charge. Table I illustrates the time required for the steps of continuous charging, melting and refining the scrap, coke and sponge iron pellets.

Table I

Operating step:                 Time elapsed—minutes
    Power on _______________________________ 0
    Initiation of controlled pellet charging ________ 24
    All pellets charged _____________________ 69
    Tap ___________________________________ 84

Energy consumed was approximately 580 kwh./ton of steel tapped. A comparable heat time for melting and refining an all-scrap charge in the same furnace, according to conventional practice, was 161 minutes with an energy consumption of about 640 kwh./ton of steel tapped. The difference in power on to tap time represents a decrease time of 47.8 percent in favor of the heat made with sponge iron pellets.

EXAMPLE 2

This example illustrates the operation of the invention wherein sponge iron chips, i.e., minus 3/16 inch material having the composition described above as type B, were fed continuously into the 25 ton B electric-arc furnace. An inital charge consisting of 10,000 pounds of steel scrap and 20,400 pounds of sponge iron chips and 430 pounds of petroleum coke was placed in the furnace. The electrodes were lowered and power applied 32 minutes for the formation of a pool of molten metal before sponge iron chips were introduced with the special charging apparatus at an average rate of 5000 pounds per minute until a total of 25,000 pounds of sponge iron from continuous charging was in the furnace to make a total sponge iron charge of 45,400 pounds or 82 percent of the metallic charge. Table II illustrates the time required for the steps or charging, melting and refining the scrap, coke and sponge iron.

Table II

Operating step:                 Time elapsed—minutes
    Power on _______________________________ 0
    Initiation of controlled charging chip ________ 32
    All chips charged _______________________ 99
    Tap ___________________________________ 138

Energy consumed was approximately 560 kwh./ton of steel tapped. The production rate was 10.6 tons of steel produced per hour. Comparable energy consumption and productivity for melting and refining an all-scrap charge on the same B furnace according to conventional practice were 570 kwh./ton of steel tapped and 8.3 tons of steel produced per hour respectively. The productivity of the furnace was increased by about 28 percent, through the use of controlled, continuous feeding of sponge iron chips. Productivity is defined as the production per unit of total furnace time.

EXAMPLE 3

This example illustrates the operation of the method of the invention wherein sponge iron of type C with high $TiO_2$ content and scrap of the type stated in Example 1 were fed to an open bath in the furnace. An initial 13,700 pound charge of scrap, 4,900 pound charge of the pellets and 400 pound charge of coke was fed to the furnace. The electrodes were lowered and power applied 26 minutes until the formation of the trefoil-shaped open bath before sponge iron pellets were introduced through three conduits at locations near the arc flare zones at an average rate of 420 pounds per minute until a total of 19,000 pounds of pellets from continuous charging were in the furnace to make a total pellet charge of 23,900 pounds or 63.5 percent of the metallic charge. Table III illustrates the time required for the steps of charging, melting and refining the scrap, pig iron and sponge iron pellets.

Table III

Operating step:                 Time—minutes
    Power to electrodes _____________________ 0
    Initiation of pellet charge ________________ 26
    All pellets charged _____________________ 71
    Tap ___________________________________ 95

Energy consumed was approximately 712 kwh./ton of steel tapped. This is a very reasonable power consumption considering that this material contained a high gangue content; i.e., 19.5 percent, and a combined oxygen content of 1.71 percent, well above the preferred range of 0.6 to 1.2 percent.

A comparable heat time for melting and refining a similar type of scrap, as used in Example 3, according to conventional practice, was 171 minutes with an energy consumption of 652 kwh./ton of product. There exists a widespread opinion that titania-bearing materials are not amenable to steelmaking processing. However, we found that satisfactory slags could be produced according to the method of the present invention with optimum melting and refining of the sponge iron fed thereto at a reasonable energy consumption rate.

In the three foregoing examples a vigorous, steady boiling action took place in the bath throughout pellet feeding. This boiling action significantly improved heat transfer and permitted the sponge pellets to be readily engulfed by slag, thereby increasing their rate of acceptance by the bath without the undesirable formation of floating mounds or clusters of unmelted material.

EXAMPLE 4

The example illustrates the operation of the method of the present invention at the lower residual oxygen content level of 0.1 percent wherein sponge iron having the analysis of type D in the above table was fed into the B furnace. The initial charge consisted of 8,000 pounds of scrap, 200 pounds of coke and 12,935 pounds of pellets.

The electrodes were lowered and power applied for 27 minutes before starting to feed pellets into the arc flare zones. After the pellets were fed for a few minutes at a rate expected from previous tests to give the desired results, i.e., 450 pounds per minute, it was observed that the pellets tended to accumulate in mounds and the rate of pellet addition had to be decreased to 330 pounds per minute to balance the rate of feeding with the rate of melting of the pellets. With these highly metallized pellets no boil occurred in the bath and the solutioning of the pellets in the slag was retarded. The "no boil" condition of the bath and pellet build-ups near the banks caused irregular eddy currents to be created in the bath. These in turn produced waves on the surface of the bath, causing the arcs to alternately extinguish and re-ignite frequently. The overall energy input was, therefore, lower than normal, making it necessary to further lower the rate of pellet feed to obtain the correct temperature rise. The heat time, 177 minutes, and power consumption, 635 kwh./ton of steel tapped, were comparable with that obtained in conventional practice.

It is evident, from Example 4 and to a lesser extent from Example 3, that there are limits to the amount of combined oxygen which can be tolerated in the sponge iron, if a completely controlled, continuous sprong iron pellet charging practice is to be achieved. Excessive amounts of residual combined oxygen as iron oxide may lead to too violent bath action and too high a carbon consumption, thereby necessitating the time-consuming re-carburizing operations in the refining period. On the other hand, the use of sponge containing insufficient amounts of residual combined oxygen (i.e. a highly metallized sponge) may produce a flat bath or "no boil" condition which hinders pellet solutioning in the slag layer. If highly metallized pellets are inadvertently produced, they can be used more effectively by a method of the present invention by feeding simultaneously with the pellets iron oxide, such as millscale or fine iron ore, to make up the deficiency in combined oxygen in the highly metallized sponge iron pellets.

EXAMPLE 5

This example illustrates the operation of the present invention wherein sponge iron having the analysis of type E from the above table was fed into the B furnace. This sponge was in a granular form with 97% passing through a 10 mesh screen, i.e. having a particle size of minus 1/16 inch.

The initial charge consisted of 5800 pounds of scrap, 8500 pounds of pig iron and 11,100 pounds of sponge. Power was applied for 47 minutes and continuous feeding was initiated. Granular sponge was fed to the furnace at an average rate of 438 pounds per minute. During the feed periods, the slag tended to foam and rise to envelop completely the arcs. The foaming condition, probably due to iron oxide reduction within the slag layer (it being virtually impossible for the granular sponge to pass completely through the slag), produced the desirable result of effectively insulating the arcs and thereby eliminating refractory burning.

Table V illustrates the time required for the steps of charging, melting and refining the scrap, coke and sponge iron.

Table V

| Operating step: | Time elapsed—minutes |
|---|---|
| Power on | 0 |
| Initiation of controlled spray charging | 47 |
| All sponge charged | 111 |
| Tap | 139 |

The energy consumed was approximately 540 kwh./ton of steel tapped, which was considerably below the average energy requirement of 570 kwh./ton for all-scrap heats made in the same 25 ton furnace. The lower energy consumption in the heat made with the granular sponge was due to the foamy slag which led to decreased heat losses from the metal bath. Steel productivity in the heat was 11.4 tons/hour or about 38 percent greater than the productivity of the average all-scrap heat of 8.3 tons/hour made in the same furnace.

EXAMPLE 6

An initial charge of 13,500 pounds of scrap, 4700 pounds of pig iron and 13,800 pounds of sponge iron pellets of the composition described above as type F was charged to B furnace. The electrodes were lowered and power applied for 24 minutes for formation of a bath of molten metal before a mixture of sponge iron pellets and chips of type F was introduced in the manner described above at an average rate 383 pounds per minute until a total of 23,000 pounds of pellets and chips from continuous charging was introduced to make a total sponge iron charge of 36,800 pounds or 69 percent of the metallic yield of 52,000 pounds. The sponge iron constituted 70 percent pellets within the size range of minus 5/8 inch plus 3/16 inch and 30 percent chips having a particle size smaller than 3/16 inch. Table VI illustrates the time required for the steps of charging, melting and refining the scrap, pig iron and sponge iron pellets and chips.

Table VI

| Operating step: | Time—minutes |
|---|---|
| Power to electrodes | 0 |
| Initiation of pellet charge | 24 |
| All pellets charged | 69 |
| Tap | 87 |

Energy consumption was approximately 555 kwh./ton of steel tapped at a power input of 7.1 megawatts; productivity being 10.4 tons/hour for an improvement in productivity of about 25.4 percent relative to a comparable all-scrap heat of 8.3 tons/hour. A foamy slag about one foot thick was generated in each location of the continuous sponge feed effectively burying the electric arc to prevent refractory burning and improve heat transfer to the system. The melting rates with foamy slags induced by the continuous feed of fine sized sponge iron was about equal to the melting rates obtained by the feed of pellets but the energy consumption was enhanced. A series of trial runs indicated an energy consumption of 539 kwh./ton tapped, corrected to 525 kwh./ton, can be obtained with the controlled continuous feed of fine sized sponge iron.

The examples described hereinabove showing the reduced energy consumptions attainable with the present invention were conducted in 15 and 25 ton furnaces, A and B, respectively. It will be evident that improved energy consumption as low as 350 kwh./ton of product for cold charges and 250 kwh./ton of product with the use of hot metal or the preheating of the charge constituents may be attained with furnaces of increased capacity as compared with 400 kwh./ton for all scrap charges. For example, iron-bearing materials such as sponge iron in the form of pellets introduced into the furnace can be heated in a neutral atmosphere to a temperature below the melting point of the pellets prior to charging to accelerate melting of the charge within the furnace.

Figure 5:
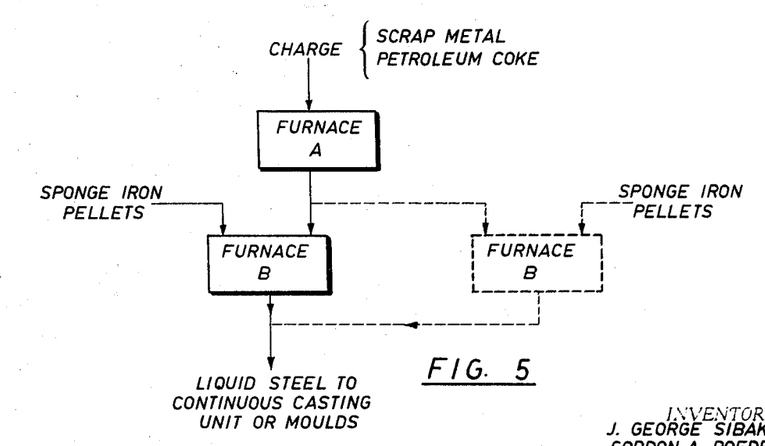
FIGURE 5 is a flowsheet of a steelmaking system using the method of the present invention.

FIGURE 5 exemplifies a steelmaking system utilizing the method and apparatus of the present invention wherein melt furnace A is arranged in series with one or more refining furnaces B such that furnace A which receives scrap metal and a carbon-containing material such as petroleum coke produces a molten metal which can be transferred to furnaces B by ladles or the like conveying means. The hot metal forms an open bath in each of furnaces B and, after a suitable slag blanket or layer has been formed, the iron-bearing material such as sponge iron pellets is continuously fed to the slag blanket, preferably in proximity to the arc flare zone and partly surrounding it, for melting and refining as described hereinabove. The refined steel can be poured into molds or into continuous casting units.

The present invention provides a number of important improvements in electric-arc steelmaking. By charging the furnace only once in the conventional manner, and by feeding the remainder of the metallic charge as sponge iron pellets through the roof into the area of the arc flare zones, a significant reduction in heat time is realized such thtat productivity of the furnace can be increased by more than 25 percent with, in some tests, increases of up to 60 percent being achieved.

Figure 6:
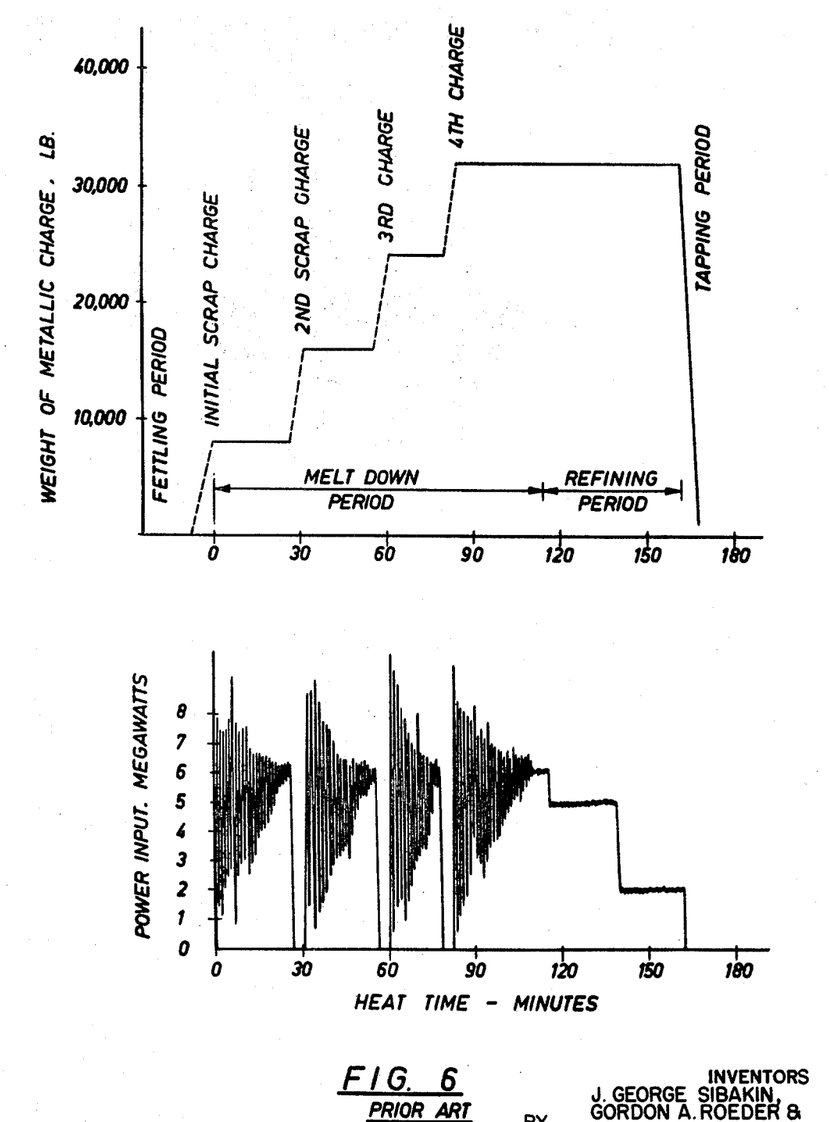
FIGURE 6 is a graphical illustration of charge weight and power input relative to heat time for conventional electric steelmaking practice utilizing scrap material showing meltdown and refining periods.
Figure 7:
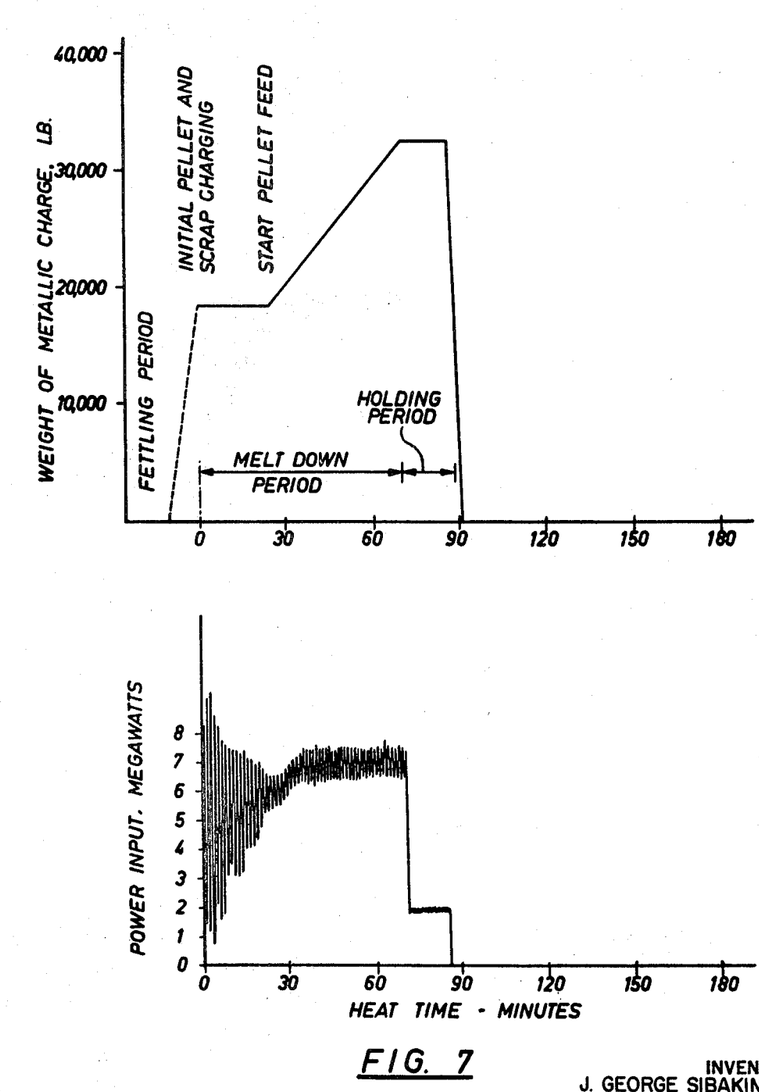
FIGURE 7 is a graphical illustration of charge weight and power input relative to heat time for the method of the invention utilizing controlled continuous charging of sponge iron pellets showing meltdown and holding periods.
Figure 8:
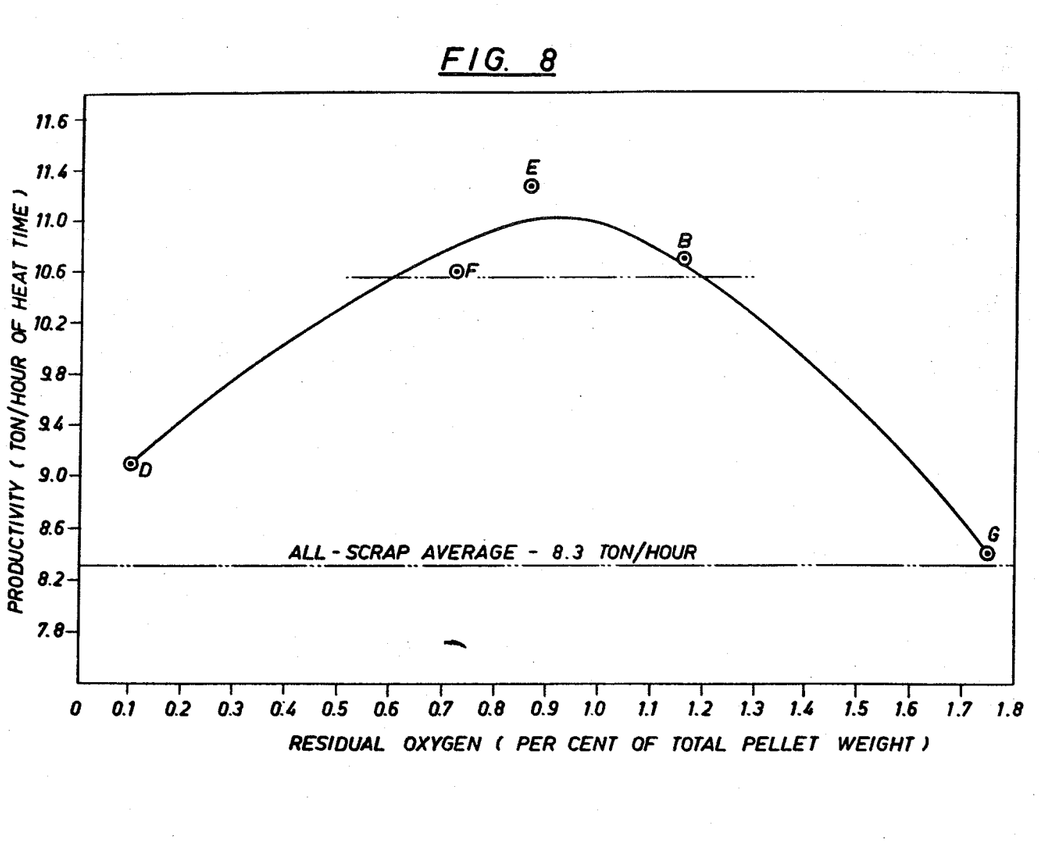
FIGURE 8 is a graphical illustration of the effect of residual oxygen on furnace productivity.

The increase in productivity made possible by the controlled continuous charging method of the present invention, as illustrated in FIGURE 8 wherein productivities of the several iron-bearing materials treated in furnace B, namely types B, D, E, F and G are illustrated relative to their respective residual oxygen contents and compared with conventional treatment of scrap, may be understood with reference to the schematic graphs shown in FIGURES 6 and 7 from which it will be evident that the use of the present invention for feeding sponge iron at a controlled, continuous rate during meltdown eliminates the need for making recharges of scrap to attain the desired final weight of metal. By this practice the loss in operating time which accrues during each recharge and also the loss of heat energy from the furnace when the roof is removed are avoided. The elimination of recharges is an important improvement in electric-arc steelmaking, the rewards being shorter processing time with lower electrical energy consumption.

When the scrap has been melted sufficiently to provide trefoil pools of metal around the electrodes, and when controlled, continuous pellet charging is commenced at a rate where the pellets are takn quickly into solution in the slag and a regular, controlled boil therefore established, the arcs become stabilized and a higher power input can be achieved due to the uniform energy demand created by the steady stream of incoming sponge iron pellets. The difference in power input permitted in conventional scrap practice where erratic fluctuations in electrical power input are a normal occurrence, FIGURE 6, compared with the method of the present practice where very steady high power input is possible, FIGURE 7, will also be evident.

An advantage of this improvement in electric-arc steelmaking is that with a higher and more uniform power input to the furnace the time required to melt the charge is shortened and the amount of circuit breaker maintenance is decreased. A further advantage of smaller surges in power may be realized in those furnace loactions where the electrical power companies object to the maximum swings in demand and insist upon additional reactance in the primary circuit to dampen these swings. In such localities the use of controlled, continuous sponge iron pellet feeding obviates such limitations to furnace power input. A further significant advantage from having a stabilized arc is the quieter operation which is of considerable importance to the melting shop personnel.

The life of the furnace refractories is enhanced when using controlled, continuous pellet charging. The curtain of falling sponge iron is proximity to and partly surrounding the arc, shown most clearly in FIGURES 2 and 3, effectively shields the walls and roof from the intense heat of the arc flare zones. Thus as long as sponge iron is being fed into the locations described herein, maximum power settings may be employed without fear of seriously damaging the furnace refractories. We have also found that the utilization of fine iron bearing material in the continuous charge, such as described in Examples 5 and 6, permits the controlled generation of a foamy slag which envelopes the arc for improved heat transfer and reduced energy consumptions at high power inputs while protecting the refractory lining from radiant heat damage.

In many areas where electric-arc furnace steelmaking shops are located, the quality of the scrap that is available is very poor; i.e., having an unknown and highly variable composition. In these areas, it is particularly desirable to have, in addition to the scrap as melting stock, sponge iron having a known composition with a low tramp element content. The use of the present invention has proven to be an effective way of utilizing sponge iron in amounts of up to at least 80 percent of the charge without encountering the problems of cluster formation normally associated with sponge iron. This is an important advantage of the present invention.

Another important improvement in electric-arc steelmaking realized in using the present invention is the virtual elimination of the defining period. The high purity of the sponge iron pellets allows, as soon as all of the charge is melted, the production of steel having a sulphur and phosphorus content below the specified percentages for commercial steel grades. The controlled, continuous feeding of sponge iron pellets containing from 0.1 to 1.75 percent residual oxygen combined with iron, preferably from 0.6 to 1.2 percent, also allows the formation of a steady, active boil which removes carbon from the bath at a predictable and controllable rate so that at meltdown the bath of steel contains the desired or substantially desired carbon content. The steady, active boil also ensures that the non-metallic inclusions in the steel bath are brought to the surface and into the slag, giving rise to maximum steel cleanliness. The continuous feeding of sponge iron pellets is controlled at a rate that permits a steady rise of bath temperature such that the molten steel substantially reaches the desired tap temperature concurrent with completion of the feeding of the sponge iron pellets. A shortened, or substantially obviated, time for refining operations, i.e., removal of impurities and adjustment of the carbon content and bath temperature, therefore is achieved as is clearly indicated in FIGURE 7.

It will be understood that although the description of the methods of the present invention has proceeded with reference to "sponge iron," this term is intended to encompass discrete, free-flowing, iron-bearing materials in general, briquettes, granules, punchings, borings and fragmentized scrap which have a composition within the range of from 76 percent to 99.5 percent by weight total iron and residual oxygen with iron content of from 0.1 percent to 1.75 percent by weight.

Alloying and fluxing materials such as ferromanganese, ferrosilicon, lime and the like addition to that used in the initial charge can be added to the molten metal for refining of the metal within the furnace. The furnace can be adapted to discharge refined molten metal continuously to a casting unit wherein the quantity of metal tapped would be brought into phase with the quantity of iron-bearing material charged to the furnace.

The apparatus of the present invention can be arranged in conjunction with a rotary kiln for receiving hot sponge iron, carburized, if desired, directly from said kiln.

The present invention may also be used in the manufacture of gray cast iron and the like by recarburizing the bath after meltdown.

It will be understood, of course, that modifications can be made in the preferred embodiments of the invention described and illustrated herein without departing from the scope and purview of the appended claims.

The invention claimed is:

1. A method of continuous making steel having carbon in the approximate range of from 0.02 percent to 1.8 percent by weight and the other constituents in a refined state which comprises charging of an iron-bearing material into an electric-arc furnace, melting said iron-bearing material to form an open bath of molten metal, continuously charging a discrete, carbon containing, iron-bearing material having a composition within the range of from about 76 percent to about 99.5 percent by weight total iron with a residual oxygen content of from about 0.1 percent to about 1.75 percent by weight into said bath at a controlled rate relative to power input such that the molten metal has substantially reached the desired tap temperature and carbon content concurrent with completion of the feeding of said iron-bearing material to the furnace.

2. A method of steelmaking comprising initially charging an electric-arc furnace having three electrodes with scrap metal, fluxing, carbon and alloying additives, positioning the electrodes in proximity to said charge, applying power to said electrodes to direct arcs from said electrodes to said charge to form consolidated bore cavities having a trefoil shaped pool of molten metal therein, continuously feeding discrete particles of iron-bearing material having a composition within the range of from about 76 percent to about 99.5 percent by weight total iron having a residual oxygen combined with iron content of from about 0.1 percent to about 1.75 percent by weight into said pool in proximity to arc flare locations while simultaneously and continuously applying power to melt and to refine said charge until up to about 80 percent of the total melt charged is from said discrete particles and said entire charge is melted and refined, and tapping the refined steel from the furnace while the total energy consumption is within the range of from about 250 to about 700 kwh./ton of iron-bearing material, said steel having a carbon content of from about 0.02 percent to about 1.8 percent by weight.

3. A method of making steel having carbon in the approximate range of from 0.02 percent to 1.8 percent by weight and the other constituents in a refined state comprising initially charging an electric-arc furnace having electrodes with scrap metal, fluxing, carbon, and alloying additives, and discrete particles of iron-bearing material having a composition within the range of from about 76 percent to about 99.5 percent by weight total iron having a residual oxygen content of from about 0.6 percent to about 1.2 percent by weight, positioning the electrodes in proximity to said charge, applying power to said electrodes to direct arcs from said electrodes to said charge to form bore cavities having molten metal therein for consolidation to form a unitary pool of said metal, continuously feeding additional discrete particles of material having said composition into arc flare locations while simultaneously and continuously applying power to melt and to refine said charge, until up to about 80 percent of the total metal charge is from said discrete particles and said entire charge is melted and refined, and tapping the refined steel from the furnace while the total energy consumption is within the range of from about 250 to about 700 kwh./ton of iron-bearing material.

4. In a method as claimed in claim 1, said bath comprising molten scrap metal having an initial carbon content higher than the carbon content of the refined steel.

5. In a method as claimed in claim 1, said iron-bearing material being sponge iron produced in a rotary kiln fed hot to the furnace.

6. In a method as claimed in claim 1, said iron-bearing material being carburized sponge iron.

7. In a method as claimed in claim 1, said iron-bearing material being $TiO_2$ bearing sponge iron.

8. In a method as claimed in claim 1, said iron-bearing material being sponge iron particles of which at least 30 percent is minus 3/16 inch in size.

9. In a method as claimed in claim 1, said iron-bearing material being sponge iron particles minus 1/16 inch in size.

10. In a method as claimed in claim 1, said iron-bearing material being fragmentized scrap with free-flowing millscale or fine iron ore for providing a source of oxygen.

11. In a method as claimed in claim 1, adding a carbon-bearing material to said bath before tapping the molten steel for recarburizing the steel as gray cast iron.

12. The method of claim 1, in which the continuous feeding of the discrete particles into the arc flare locations occurs after the initial charge melting is substantially complete.

13. A method of making steel having carbon in the approximate range of from 0.02 percent to 1.8 percent by weight and the other constituents in a refined state in an electric-arc furnace which comprises forming a bath of carbon-containing molten metal in said furnace having a thin fluid slag layer, and continuously feeding a discrete, free-flowing, iron-bearing material having a composition within the range of from about 76 percent to about 99.5 percent by weight total iron with a residual oxygen content of from about 0.1 percent to about 1.75 percent by weight into said slag layer at a rate relative to the power input to maintain the desired bath temperature, and continuously withdrawing said molten metal for subsequent processing.

14. A method of making steel having carbon in the approximate range of from 0.02 percent to 1.8 percent by weight and the other constituents in a refined state in an electric-arc furnace which comprises forming a bath of carbon-containing molten metal in said furnace having a slag layer, and continuously feeding a discrete, free-flowing, iron-bearing material having a composition within the range of from about 76 percent to about 99.5 percent by weight total iron with a residual oxygen content of from about 0.1 percent to about 1.75 percent by weight into said slag layer at a rate relative to the power input such that the molten metal has substantially reached the desired tap temperature and carbon content substantially concurrent with completion of the feeding of said iron-bearing material.

15. In a method as claimed in claim 14, said bath comprising molten scrap metal having a carbon content higher than the carbon content of the refined steel.

16. In a method as claimed in claim 14, said iron-bearing material being sponge iron produced in a rotary kiln fed hot to the slag layer.

17. In a method as claimed in claim 14, said iron-bearing material being carburized sponge iron.

18. In a method as claimed in claim 14, said iron-bearing material being $TiO_2$-bearing sponge iron.

19. In a method as claimed in claim 14, said iron-bearing material being sponge iron particles of which at least 30 percent is minus 3/16 inch in size.

20. In a method as claimed in claim 14, said iron-bearing material being sponge iron particles minus 1/16 inch in size.

21. In a method as claimed in claim 14, said iron-bearing material being fragmentized scrap with free-flowing milliscale or fine iron ore for providing a source of oxygen.

References Cited
UNITED STATES PATENTS

| | | | |
|---|---|---|---|
| 1,535,311 | 4/1925 | Holloway | 75—12 |
| 1,902,638 | 3/1933 | Gustafsson | 75—12 |
| 2,502,259 | 3/1950 | Hulme | 75—12 X |
| 3,188,197 | 6/1965 | Ostberg | 75—12 X |
| 2,805,930 | 9/1957 | Udy | 75—11 |
| 3,153,588 | 10/1964 | Madaras | 75—43 X |
| 3,202,503 | 8/1965 | Shimamura | 75—38 |

OTHER REFERENCES

Ayala, Jose, Electric Furnace Steelmaking with Sponge Iron, In Iron and Steel Engineer. XL(VIII): pp. 69–77. August 1963.

Trentini, B. Powder-Blowing Techniques for Electric Steelmaking, In Journal of Metals. 16(11): pp. 885–890. November 1964.

L. DEWAYNE RUTLEDGE, Primary Examiner

J. E. LEGRU, Assistant Examiner

U.S. Cl. X.R.

75—11, 44